United States Patent
Goldstein

(10) Patent No.: US 8,350,429 B2
(45) Date of Patent: Jan. 8, 2013

(54) SPRING ASSISTED MAGNETIC MOTOR

(76) Inventor: Marvin Goldstein, Boynton Beach, FL (US)

( * ) Notice: Subject to any disclaimer, the term of this patent is extended or adjusted under 35 U.S.C. 154(b) by 133 days.

(21) Appl. No.: 12/748,387

(22) Filed: Mar. 27, 2010

(65) Prior Publication Data

US 2011/0234023 A1 Sep. 29, 2011

(51) Int. Cl.
*H02K 33/00* (2006.01)
(52) U.S. Cl. ............ 310/152; 310/80; 310/20; 310/29
(58) Field of Classification Search ............ 310/152, 310/80, 20, 46, 103, 21, 28, 29
See application file for complete search history.

(56) References Cited

U.S. PATENT DOCUMENTS 6,002,184 A * 12/1999 Delson et al. ............ 310/14
6,891,458 B2 * 5/2005 Hyatt Jr. et al. ............ 335/267
2007/0210659 A1 * 9/2007 Long ............ 310/80

* cited by examiner

*Primary Examiner* — Quyen Leung
*Assistant Examiner* — Leda Pham
(74) *Attorney, Agent, or Firm* — Oakwood Law Group, L.L.P.; Jie Tan, Esq.

(57) ABSTRACT

A permanent magnet motor having three chambers aligned end to end where each chamber has a bar magnet. The north pole of the bar magnet in the center chamber faces the north pole of the bar magnet in the chamber to its right and the south pole of the bar magnet in the center chamber faces the south pole of the bar magnet in the chamber to its left. Structure is provided to move the end magnets away from the center magnet and, by means of springs, alternately sequentially snap the end magnets toward the center magnet to drive the center magnet back and forth in its chamber. Shaft members which are connected to gears are provided to control the movement of the end magnets and to convert the back and forth motion of the center magnet to a rotary motion.

20 Claims, 1 Drawing Sheet

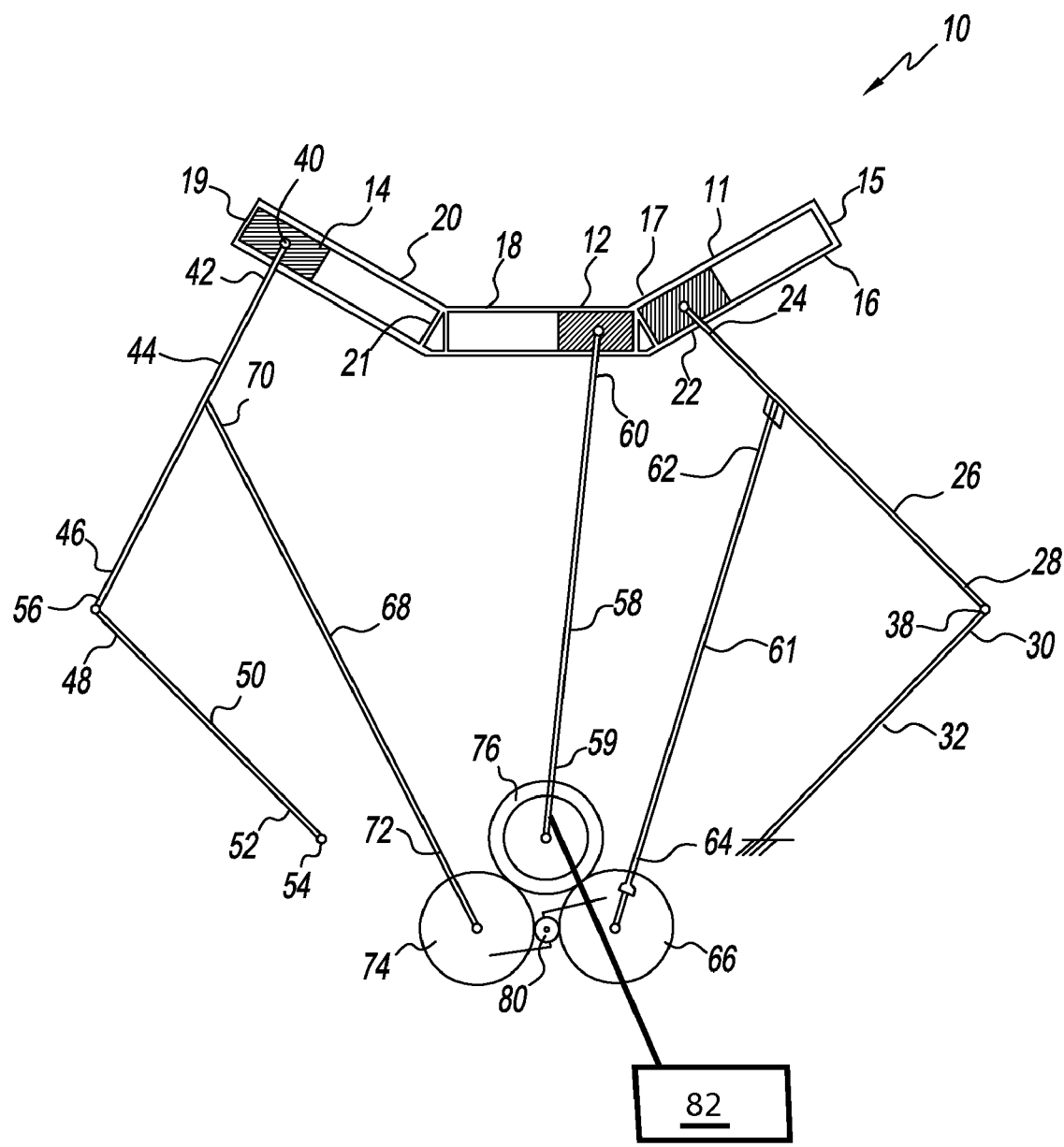

SPRING ASSISTED MAGNETIC MOTOR

BACKGROUND OF THE INVENTION

1. Field of the Invention

This invention relates generally to permanent magnet motor devices and more specifically to a spring assisted magnetic motor that uses the magnetic fields created thereby to rotate a drive gear.

2. Description of Related Art

Magnetic motors are known in the prior art. More specifically, by way of example, U.S. Pat. No. 6,867,514 to Fecera discloses a motor providing unidirectional rotational motive power. The motor has a generally circular stator with a stator axis, an outer surface, and a circumferential line of demarcation at about a midpoint of the outer surface. The motor also includes one or more stator magnets attached to the outer surface of the stator. The stator magnets are arranged in a generally circular arrangement about the stator axis and generate a first magnetic field. An armature which is attached to the stator for rotation has an axis which is parallel to the stator axis. One or more rotors, are spaced from the armature and coupled thereto by an axle for rotation about an axis of each rotor, each rotor rotates in a plane generally aligned with the armature axis. Each rotor includes one or more rotor magnets, with each rotor magnet generating a second magnetic field. The second magnetic field generated by each rotor magnet interacts with the first magnetic field to cause each rotor to rotate about the rotor axis. A linkage assembly drivingly connects each rotor to the stator to cause the armature to rotate about the armature axis to provide the unidirectional rotational motive power of the motor.

U.S. Pat. No. 6,700,248 to Long discloses a non-linear magnetic harmonic motion converter for transferring non-linear motion into rotational motion for producing work from the interaction of at least two magnetic fields. An axial shaft is disposed in rotating relationship with a gimbal supported magnet that reciprocates in relation to the axial shaft. A rotor magnet is positioned to rotate in relation to the axial shaft in response to a non-linear movement of the gimbal supported magnet. A plurality of rotor magnet units are disposed to rotate about separate axial shafts, with each rotor magnet unit having a rotor magnetic field influenced by the non-linear movement of the gimbal supported magnet. Movement of each gimbal supported magnet creates repulsion and attraction of each respective rotor magnet, with inducement of axial shaft rotation, to produce rotational movement that is harnessed to perform work. Also disclosed are combinations of rotor magnet units disposed to rotate about respective axial shafts upon the reciprocation of a central gimbal supported magnet, for the operation of a fluid transfer pump and/or an electric generator.

U.S. Pat. No. 4,600,844 to Lawson, et al. discloses a self-starting rotational motor capable of providing significant torque which employs a magnetic propelling force. The motor is based on the principle of maintaining interacting substantially perpendicular rotor and stator magnet flux fields, one within the other, without gaps or spacing around the entire circumference of the magnet stator. The rotor magnets are controlled and moved relative to the stator magnets by a mechanism whereby the perpendicular rotor and stator magnet flux fields are maintained constantly in interacting relationship to produce turning of the rotor in one direction.

U.S. Pat. No. 4,300,067 to Schumann discloses a permanent magnet motion conversion device which includes spaced stationary permanent magnets and a carriage having permanent magnets located adjacent to the ends of the carriage. The carriage shuttles back and forth between the permanent magnets as a result of magnetic repulsion when shield plates are moved into and out of shielding positions in front of the stationary magnets. The carriage is provided with a connecting rod which is connected to a crank shaft.

U.S. Pat. No. 4,151,431 to Johnson discloses permanent magnet motors having ferro magnetic and other materials as a source of magnetic fields for producing power without any electron flow. Permanent magnets are utilized to produce a motive power source solely through the superconducting characteristics of a permanent magnet and the magnetic flux created by the magnets are controlled and concentrated to orient the magnetic forces generated in such a manner to do useful continuous work, such as the displacement of a rotor with respect to a stator. The timing and orientation of magnetic forces at the rotor and stator components produced by permanent magnets to produce a motor is accomplished with the proper geometrical relationship of these components.

U.S. Pat. No. 3,899,703 to Kinnison discloses a magnetic motor having at least one drive unit including first and second stationary magnets arranged with inverse directions of polarity and a movable magnet mounted for movement within the magnetic fields of the first and second stationary magnets. A diverter device is switched between two positions for alternately diverting the magnetic fields of the first and second stationary magnets. The movable magnet is alternately switched into alignment with the first and second stationary magnets, while the diverter diverts the magnetic field from the other magnet. In this manner a repulsion force is created which causes the continued movement of the movable magnet.

SUMMARY OF THE INVENTION

In an exemplary embodiment of the present invention, there is disclosed a permanent magnet motor comprising:
- a first chamber having a first end at its left and a second end at its right;
- a first permanent magnet having a north pole end facing the first end of said first chamber and a south pole end facing the second end of said first chamber, wherein said first magnet is adapted to move between said ends of said first chamber;
- a second chamber located at the right of said first chamber having a first end at its left and a second end at its right wherein said first end of said second chamber is opposite said second end of said first chamber;
- a second permanent magnet having a north pole end facing the second end of said second chamber and a south pole end facing the first end of said second chamber, wherein said second magnet is adapted to move between said ends of said second chamber;
- a third chamber located at the left of said first chamber having a first end at its left and a second end at its right wherein said second end of said third chamber is opposite said first end of said first chamber;
- a third permanent magnet having a south pole end facing the first end of said third chamber and a north pole end facing the second end of said third chamber, wherein said third magnet is adapted to move between said ends of said third chamber;
- a first shaft coupled at one end to said first permanent magnet and to a first gear via a gear drive means at a second end;
- a second shaft coupled at one end to said second permanent magnet and pivotally coupled to a first fixed member at a second end;

a first spring coupled to said second shaft;
a third shaft coupled at one end to said second shaft and to a second gear at a second end;
a fourth shaft coupled at one end to said third permanent magnet and pivotally coupled to a second fixed member at a second end; and
a second spring coupled to said fourth shaft;
a fifth shaft coupled at one end to said fourth shaft and to a third gear at a second end;
wherein said first and second springs alternately sequentially snap said second and third permanent magnets toward said first permanent magnet to urge said first magnet to move back and forth between the first and second ends of said first chamber.

In another exemplary embodiment of the present invention there is disclosed a method of producing a unidirectional motive force with permanent magnets comprises:
providing a first chamber having a first end at its left and a second end at its right;
providing a first permanent magnet having a north pole end facing the first end of said first chamber and a south pole end facing the second end of said first chamber, wherein said first magnet is adapted to move between said ends of said first chamber;
providing a second chamber located at the right of said first chamber having a first end at its left and a second end at its right wherein said first end of said second chamber is opposite said second end of said first chamber;
providing a second permanent magnet having a north pole end facing the second end of said second chamber and a south pole end facing the first end of said second chamber, wherein said second magnet is adapted to move between said ends of said second chamber;
a third chamber located at the left of said first chamber having a first end at its left and a second end at its right wherein said second end of said third chamber is opposite said first end of said first chamber;
providing a third permanent magnet having a south pole end facing the first end of said third chamber and a north pole end facing the second end of said third chamber, wherein said third magnet is adapted to move between said ends of said third chamber;
connecting one end of a first shaft to said first permanent magnet and a second end to a first gear via a gear drive means;
connecting one end a second shaft to said second permanent magnet and pivotally coupling said second end to a first fixed member;
connecting a first spring to said second shaft;
connecting one end of a third shaft to said second shaft and a second end to a second gear;
connecting one end of a fourth shaft to said third permanent magnet and pivotally coupling a second end to a second fixed member at a second end;
connecting a second spring to said fourth shaft; and
connecting one end of a fifth shaft to said fourth shaft and to a third gear at a second end;
wherein said first and second springs alternately sequentially snap said second and third permanent magnets toward said first permanent magnet to urge said first magnet to move back and forth between the first and second ends of said first chamber.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 1 is an elevational representation of a magnetic motor illustrating one position of the magnets in accordance with the principles of the invention.

DESCRIPTION OF THE PREFERRED EMBODIMENT

Electric motors operate on the principle that when an energized conductor is located in a magnetic field, a magnetic force is exerted upon the conductor which is used to rotate a shaft.

In an electric motor, either one or both of the rotor and/or stator are wired to obtain a magnetic force which causes the rotor of the motor to rotate. Electric motors can have permanent magnets in the rotor or the stator, but regardless of where the permanent magnets are located, an electrical current in either the rotor or stator is required to obtain an electrical field which, together with the field produced by the permanent magnets to produce a force which can cause rotation of the rotor.

In a permanent magnet the magnetic lines of force do not cease, and this magnetic force can be made to do work. In the prior art this magnetic force of permanent magnets have not been fully utilized because of the difficulties involved in switching this magnetic force on and off as is done with an electric current in a conventional electric motor to obtain the thrust necessary to move the motor armature.

To obtain the switching function of the magnetic field in a permanent magnet motor, the magnetic field of a stator magnet must be selectively moved toward a rotor magnet and away from the rotor magnet. The timing and switching function can be obtained in a permanent magnet motor by providing a motor that is configured to link control of the movement of different permanent magnets with the rotation of a drive gear or shaft. By controlling the geometry and magnetic concentration, a mechanical advantage capable of producing a continuous motive force can be obtained.

Referring to FIG. 1 there is shown an elevation representation of a spring assisted magnetic motor 10 illustrating one position of the magnets in accordance with the principles of the invention. The embodiment of the spring assisted magnetic motor is based on the precise timing of the gears, springs and magnets as they perform in conjunction with each other. Three permanent magnets 11, 12 and 14 are slidably encased in separate nonmagnetic chambers 16, 18 and 20 which are aligned in a common plane. Each magnet is slidably enclosed in its chamber in as friction less manner as is possible.

Magnet 11 is slidably coupled to chamber 16 and is pivotally connected at a center location 22 to a first end 24 of an shaft 26. The other end 28 of shaft 26 is pivotally connected to an end 30 of shaft 32 which is fixed in position and is not movable. A torsion spring 38, or a spring in compression located at the end 28 of shaft 26 is oriented to urge shaft 26 to rotate in a counter clockwise direction about end 28 which, in turn, urges magnet 11 to move from right to left to the end 17 of chamber 16.

In a similar manner, magnet 14 is slidably coupled to chamber 20 and is pivotally connected at a center location 40 to a first end 42 of a shaft 44. The other end 46 of the shaft 44 is pivotally connected to an end 48 of shaft 50 which is fixed in position and is not movable. A torsion spring 56 located at the junction of shaft 44 and shaft 50 is oriented to urge shaft 44 to rotate in a clockwise direction about end 46 which, in turn, urges magnet 14 to move from left to right to the end 21 of the chamber 20. Magnet 12 in chamber 18 is pivotaly connected to an end 60 of shaft 58. The three magnets 11, 12 and 14 are shown as being positioned at an angle relative to each other. However, it is understood that the magnets can be located in a straight line.

A shaft 61 has one end 62 which is controllably attached to and separated from shaft 26 and is eccentrically connected at its other end 64 to a gear 66. In a similar manner, shaft 68 has one end 70 which is controllably attached to and separated from shaft 44 and is eccentrically connected at its other end 72 to a gear 74.

Referring to connection of shaft 61 to shaft 26, as gear 66 rotates in, for example, a clockwise direction, end 62 of shaft 61 moves up and down along shaft 26. When end 62 of shaft 61 is at a high position on shaft 26 it engages shaft 26 and urges shaft 26 to move clockwise about its end 28. As shaft 26 moves clockwise, spring 38 is placed in increased tension. As shaft 26 moves clockwise, it moves magnet 11 from the left to the right of chamber until magnet 11 reaches the end 15 of chamber 16. At this time the end 62 of shaft 61 is at the low end of its downward motion and, when at the low end of shaft 26 it is automatically released from shaft 26. When shaft 61 is released from shaft 26, spring 38 which is in high compression or tension urges shaft 26 to quickly move in a counter clockwise direction which snaps magnet 11 to move to the left and to the end 17 of chamber 16. As gear 66 continues to rotate, end 62 of shaft 61 slides up along shaft 26 until it reaches the top of its path, at which time it automatically engages shaft 26 and urges shaft 26 to rotate in a clockwise direction to repeat the cycle just described. The structure located on the end 62 of shaft 61 which cooperated with the structure on the shaft 26 for providing the action of moving magnet 11 to the end 15 of chamber 16 and then abruptly releasing the shaft 26 to snap the magnet toward the end 17 of chamber 16 is well known to those having ordinary skill in the art and, therefore, is not shown.

The operation of shaft 68, shaft 44 and magnet 14 for moving magnet 14 to the left until it reaches the end 19 and is then abruptly snapped to the right is similar to the operation just described for shaft 61, shaft 26 and magnet 14 and, therefore, is not here repeated.

During operation of the spring assisted magnetic motor, magnet 12 is moved back and forth by the same polarity, north to north, or south to south, of magnets 11 and 14 as they move towards and away from magnet 12. Shaft 58 is attached to magnet 12 at one end 60, and to gear 76 at its other end 59. As magnet 12 moves back and forth from left to right and then from right to left, gear 76 is rotated, for example in the counter clockwise direction which, in turn, rotates gears 74 and 66 in the clockwise directions. As noted above, gears 66 and 74 are coupled to and move shafts 61 and 68 along shaft 26 and 44. As shafts 61, 68 move along shafts 26, 44 and alternately rotate the shafts 26 and 44, they alternately increase the tension in the springs 38, 56. When the shafts 62, 70 reach the top of their travel paths and release the shafts 26, 44, the springs snap the magnets 11, 14 toward magnet 12.

The movement of magnets 11 and 14 toward magnet 12 does not occur simultaneously, but alternately sequentially at opposite ends of the cycle. Each gear 66 and 74 is coupled to rotate drive gear 80 in a clock-wise direction through a pawl mechanism such as a hinged catch that fits into notches on the drive gear to rotate the drive gear in one direction which is known by those having ordinary skill in the art and, therefore, is not shown.

The spring assisted magnetic motor here disclosed is not self starting. Therefore, a small electric motor 82 may be coupled to the shaft of gear 76 to start the spring assisted magnetic motor at each time it stops.

The curvature of chambers 16 and 20 and magnets 11 and 14 is determined by the radius and position of shafts 26 and 44. The curvature of chamber 18 and magnet 12 is determined by the length of shaft 58.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A permanent magnet motor comprising:
   a first chamber having a first end at its left and a second end at its right;
   a first permanent magnet having a north pole end facing the first end of said first chamber and a south pole end facing the second end of said first chamber, wherein said first magnet is adapted to move between said ends of said first chamber;
   a second chamber located at the right of said first chamber having a first end at its left and a second end at its right wherein said first end of said second chamber is opposite said second end of said first chamber;
   a second permanent magnet having a north pole end facing the second end of said second chamber and a south pole end facing the first end of said second chamber, wherein said second magnet is adapted to move between said ends of said second chamber;
   a third chamber located at the left of said first chamber having a first end at its left and a second end at its right wherein said second end of said third chamber is opposite said first end of said first chamber;
   a third permanent magnet having a south pole end facing the first end of said third chamber and a north pole end facing the second end of said third chamber, wherein said third magnet is adapted to move between said ends of said third chamber;
   a first shaft coupled at one end to said first permanent magnet and to a first gear via a gear drive means at a second end;
   a second shaft coupled at one end to said second permanent magnet and pivotally coupled to a first fixed member at a second end;
   a first spring coupled to said second shaft;

a third shaft coupled at one end to said second shaft and to a second gear at a second end;
a fourth shaft coupled at one end to said third permanent magnet and pivotally coupled to a second fixed member at a second end;
a second spring coupled to said fourth shaft;
a fifth shaft coupled at one end to said fourth shaft and to a third gear at a second end; and
an electric motor connectable to a power source, said electric motor being connected with said second shaft to provide a push on said second shaft;
wherein said first and second springs alternately sequentially snap said second and third permanent magnets toward said first permanent magnet to urge said first magnet to move back and forth between the first and second ends of said first chamber.

2. The permanent magnet motor of claim 1 wherein said first, second and third permanent magnets are bar magnets.

3. The permanent magnet motor of claim 1 wherein said first, second and third chambers are nonmagnetic.

4. The permanent magnet motor of claim 3 wherein said first, second and third magnets slidably move between said ends of the chambers.

5. The permanent magnet motor of claim 1 wherein the gear drive means that couples the second end of the first shaft to the first gear is a pawl having a hinged catch that fits into a notch on said first gear to rotate the first gear in a single direction as the first shaft moves back and forth.

6. The permanent magnet motor of claim 1 wherein said second end of said third and fifth shafts are eccentrically attached to said second and third gears.

7. The permanent magnet motor of claim 1 wherein said third shaft is slidably coupled to said second shaft and said fifth shaft is slidably coupled to said fourth shaft.

8. The permanent magnet motor of claim 7 wherein said third shaft urges said second shaft to move said second magnet toward said second end of said second chamber and then release said shaft to allow said first spring to snap said shaft and second magnet toward the first end of said chamber; and wherein said fifth shaft urges said fourth shaft to move said third magnet toward said first end of said third chamber and then release said shaft to allow said second spring to snap said shaft and third magnet toward the second end of said chamber.

9. The permanent magnet motor of claim 8 wherein said second and third magnets are snapped toward the first and second ends of their respective chambers alternately sequentially at opposite ends of the cycle.

10. The permanent magnet motor of claim 9 wherein said second and third gears are driven by said first gear and via hinge catches that fit into notches on a drive gear to continuously rotate said drive gear.

11. A method of producing a unidirectional motive force with permanent magnets comprises:
providing a first chamber having a first end at its left and a second end at its right;
providing a first permanent magnet having a north pole end facing the first end of said first chamber and a south pole end facing the second end of said first chamber, wherein said first magnet is adapted to move between said ends of said first chamber;
providing a second chamber located at the right of said first chamber having a first end at its left and a second end at its right wherein said first end of said second chamber is opposite said second end of said first chamber;
providing a second permanent magnet having a north pole end facing the second end of said second chamber and a south pole end facing the first end of said second chamber, wherein said second magnet is adapted to move between said ends of said second chamber;
a third chamber located at the left of said first chamber having a first end at its left and a second end at its right wherein said second end of said third chamber is opposite said first end of said first chamber;
providing a third permanent magnet having a south pole end facing the first end of said third chamber and a north pole end facing the second end of said third chamber, wherein said third magnet is adapted to move between said ends of said third chamber;
connecting one end of a first shaft to said first permanent magnet and a second end to a first gear via a gear drive means;
connecting one end a second shaft to said second permanent magnet and pivotally coupling said second end to a first fixed member;
connecting a first spring to said second shaft;
connecting one end of a third shaft to said second shaft and a second end to a second gear;
connecting one end of a fourth shaft to said third permanent magnet and pivotally coupling a second end to a second fixed member at a second end;
connecting a second spring to said fourth shaft; and
connecting one end of a fifth shaft to said fourth shaft and to a third gear at a second end; and
connecting said second shaft to an electric motor that is connectable to a power source, when in use, said electric motor is to provide a push on said second shaft;
wherein said first and second springs alternately sequentially snap said second and third permanent magnets toward said first permanent magnet to urge said first magnet to move back and forth between the first and second ends of said first chamber.

12. The method of claim 11 wherein said first, second and third permanent magnets are bar magnets.

13. The method of claim 11 wherein said first, second and third chambers are nonmagnetic.

14. The method of claim 13 wherein said first, second and third magnets slidably move between said ends of the chambers.

15. The method of claim 11 wherein the gear drive means that couples the second end of the first shaft to the first gear is a pawl having a hinged catch that fits into a notch on said first gear to rotate the first gear in a single direction as the first shaft moves back and forth.

16. The method of claim 11 wherein said second end of said third and fifth shafts are eccentrically attached to said second and third gears.

17. The method of claim 11 wherein said third shaft is slidably coupled to said second shaft and said fifth shaft is slidably coupled to said fourth shaft.

18. The method of claim 17 wherein said third shaft urges said second shaft to move said second magnet toward said second end of said second chamber and then release said shaft to allow said first spring to snap said shaft and second magnet toward the first end of said chamber; and wherein said fifth shaft urges said fourth shaft to move said third magnet toward said first end of said third chamber and then release said shaft to allow said second spring to snap said shaft and third magnet toward the second end of said chamber.

19. The method of claim 18 wherein said second and third magnets are snapped toward the first and second ends of their respective chambers alternately sequentially at opposite ends of the cycle.

20. The method of claim 19 wherein said second and third gears are driven by said first gear and via hinge catches that fit into notches on a drive gear to continuously rotates said drive gear.

* * * * *